(12) United States Patent
Strauss et al.

(10) Patent No.: US 8,292,092 B2
(45) Date of Patent: Oct. 23, 2012

(54) MACROCYCLIC PORE-APERTURED CARBON NANOTUBE APPARATUS

(75) Inventors: Dennis R. Strauss, Ventura, CA (US); Martin W. Kendig, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 446 days.

(21) Appl. No.: 12/555,670

(22) Filed: Sep. 8, 2009

(65) Prior Publication Data

US 2011/0056892 A1 Mar. 10, 2011

(51) Int. Cl.
*B01D 63/00* (2006.01)

(52) U.S. Cl. ......... 210/500.22; 210/500.27; 210/500.28; 210/500.23; 423/447.1; 977/746; 977/748; 977/750

(58) Field of Classification Search ............. 210/500.21, 210/500.22, 500.23, 500.27, 500.28; 96/4, 96/10; 423/447.1, 445 R, 445 B, 460, 461; 977/742, 745, 746, 748, 750, 752
See application file for complete search history.

(56) References Cited

U.S. PATENT DOCUMENTS

| | | | | |
|---|---|---|---|---|
| 7,135,057 B2* | 11/2006 | Kornilovich | ...................... | 95/90 |
| 7,419,601 B2* | 9/2008 | Cooper et al. | ................. | 210/679 |
| 7,611,628 B1* | 11/2009 | Hinds, III | ................ | 210/500.27 |
| 2007/0084797 A1* | 4/2007 | Cooper et al. | ................. | 210/660 |
| 2010/0025330 A1* | 2/2010 | Ratto et al. | ..................... | 210/651 |
| 2010/0206811 A1* | 8/2010 | Ng et al. | ..................... | 210/654 |
| 2010/0282668 A1* | 11/2010 | Cooper et al. | ........... | 210/500.21 |
| 2011/0253630 A1* | 10/2011 | Bakajin et al. | ................ | 210/651 |

OTHER PUBLICATIONS

Specification of application PCT/US2009/045675, filed on May 29, 2009.*
Specification of U.S. Appl. No. 61/056,940, filed May 29, 2008.*
Nielsen, "Biometric membranes for sensor and separation applications", Anal Bioanal Chem (2009), vol. 395, pp. 697-718, published online Jul. 28, 2009.*
Google Advanced Scholar Search: nanotube carboxyl macrocyclic aperture membrane, conducted by PTO Jun. 20, 2012.*

* cited by examiner

*Primary Examiner* — Joseph Drodge
(74) *Attorney, Agent, or Firm* — Glenn H. Lenzen; Husch Blackwell LLP

(57) ABSTRACT

A macrocyclic pore-apertured carbon nanotube apparatus is disclosed. The carbon nanotube apparatus can be used to filter or exclude ions, solutes in solution, as well as particles suspended in a colloidal mixture. The nanotube apparatus includes a carbon nanotube having a carboxylated portion at least one pore entrance and at least one molecular aperture adapted to be bonded to the carboxylated portion of the carbon nanotube. The molecular aperture is further adapted to prevent dissolved ions in a solution from entering the pore entrance. Methods for preparing and using the apparatus are also disclosed. The apparatus can also be incorporated into to filtration media for conducting reverse osmosis filtration.

10 Claims, 4 Drawing Sheets

MACROCYCLIC PORE-APERTURED CARBON NANOTUBE APPARATUS

FIELD OF THE INVENTION

The present invention relates to a macrocyclic pore-apertured carbon nanotube apparatus for use in separating and filtering ions, particles, or other solutes in a colloidal mixture or solution. The invention also relates to selected methods of preparing and using the carbon nanotube apparatus.

BACKGROUND

A carbon nanotube (CNT) refers to a nanoscale tubular structure composed of six-member carbon rings whose bonding patterns create a hexagonal lattice that closes upon itself to form the walls of the cylindrical tube structure. Carbon nanotubes are allotropes of carbon that can have a length-to-diameter ratio of up to 28,000,000:1. These cylindrical nanostructures have novel properties that make them potentially useful in nanotechnology, electronics, optics, materials science, and architectural applications. They exhibit extraordinary strength and unique electrical properties, and are efficient conductors of heat. Numerous techniques have been developed to produce nanotubes including arc discharge, laser ablation, high-pressure carbon monoxide (HiPCO), and chemical vapor deposition (CVD). Most of these processes take place in vacuum or with specific process gases. CVD growth of CNTs can occur in vacuum or at atmospheric pressure and are capable of being synthesized in large quantities using these methods.

The use of conventional reverse osmosis (RO) technology for desalination and filtration is well known. The high initial capital, operating costs, and energy requirements of RO desalination have restricted its large-scale exploitation to specific situations where there are limited sources of fresh water; for example large seafaring vessels and arid desert locations with access to an abundance of low cost energy, such as the Persian Gulf region. Moreover, conventional RO membranes have low specific flow rates due to low water mobility and high pore tortuosity. As a result, conventional RO membranes typically require relatively large, power-intensive systems for desalination. High processing pressure requirements necessitating the use of costly pumping systems and high pressure corrosion resistant piping systems also contribute to the very high capital costs associated with conventional RO desalination installations.

Conventional RO membranes are made of swollen hydrophilic polymers. Under an applied pressure gradient, water molecules move through the membrane by sequential displacement of one another in wet interstices between polymer chains. The interstices are too small for most ions to pass through. The driving force for permeation for membrane separation is the net pressure across the membrane, which is defined as the feed pressure minus the permeate or back pressure, less the difference between the osmotic pressure of the feed and the osmotic pressure of the permeate.

Reverse osmosis membrane flux rates (gallons of filtered fluid produced per an effective area unit of membrane) are typically quite low for commercial RO membranes, resulting in immense surface area requirements for such membranes. The low specific flow rates of such membranes, measured in GFD/psi (gallons of fluid per square foot of membrane area per day, per psi of net driving pressure) also necessitate a large amount of effective membrane area and a high operating pressure to obtain adequate quantities of water. Conversely, membranes using nanofiltration operate at significantly lower pressures than conventional RO membranes and have inherently higher flux rates, typically 5-6 times higher than those for RO membranes (0.11 GFD/psi vs. 0.02 GFD/psi) used during desalination.

High-selectivity of water- vs. ion-transport has not yet been demonstrated for CNT membranes at seawater salt concentrations. Various approaches to filtration, desalination, or colloidal separation using CNTs have been investigated. Accurately and efficiently matching the pore entrance of such CNTs to a target molecule or ion size is important to attain more efficient molecular sieving and/or ionic interaction with selective solutes, molecules or colloidal particles filtered through the CNT. It is difficult to directly manufacture CNTs having precise predetermined pore sizes. Therefore, a need exists for a CNT that can provide a uniform or highly selective pore configuration for use in a number of applications such as chemical separation, desalination, and wastewater remediation. Accordingly, there is a need for a nominally macrocyclic molecular ion-exclusion pore aperture linked CNT that is robust and highly stable in order to facilitate efficient filtration, desalination, and similar particle separation applications.

SUMMARY OF THE INVENTION

The present disclosure provides for a macrocyclic pore-apertured carbon nanotube apparatus as well as methods for preparing and using the apparatus. More particularly, a CNT is developed that includes an attached macrocyclic molecule or macrocycle having a preselected size designed to prevent certain ions from passing through the CNT. Specifically, a macrocyclic molecular ion-exclusion pore-apertured CNT is provided that can be used to filter or exclude ions, solutes in solution, as well as particles suspended in a colloidal mixture.

The apertured CNT composition for filtering a solute in a solution includes a CNT composed of a cylindrical sheet of graphene. The cylinder has a carboxyl group on at least one pore entrance and at least one macrocyclic molecule bonded to the carboxyl group on the CNT, such that the macrocyclic molecule is an aperture for the pore entrance. Chiral, armchair, and/or zigzag nanotubes, having an inner van der Waals diameter ranging from 0.4 nm to 1.1 nm and an outer van der Waals diameter ranging from 1.0 nm to 1.7 nm, may be used in the composition. The length of the nanotubes may also vary and range from 200 nm to 1000 nm.

The macrocyclic molecule may have a formula of $C_nH_{2n-2}$, where n=18-24, or may be a polyazacycloalkane, polyoxacycloalkane, polythiacycloalkane, or a combination thereof, bonded to the CNT by carbon, nitrogen, oxygen, or sulfur. The molecule has an inner diameter ranging between 0.3 nm and 0.6 nm such that it may serve as an aperture for the open pore entrance of the CNT. As a pore aperture, the molecule can be adapted to prevent ions (e.g. $Na^+$, $K^+$, $Ca^+$, $Mg^+$, $Cl^-$, and $SO_4^{2-}$) from entering the CNT.

The present invention also provides a method for making the apertured CNT apparatus. The method includes purifying the CNT to remove any contaminants formed during manufacture of the nanotube. After purification, the CNT is analyzed to determine if the pore entrance contains any naturally occurring carboxyl groups. If the CNT does not possess a naturally occurring carboxyl group at the pore entrance, then carboxyl functional groups may be purposefully formed at the pore entrance. In a vessel, the CNT is placed in an acid bath of $H_2SO_4$—$HNO_3$ having a respective concentration ratio of 3:1. The CNT and acid mixture is heated to a temperature of approximately 40° C. Ultrasonication is used to promote an oxidation reaction between the pore entrance of the CNT and the acid mixture, which results in the formation of a carboxyl group at the pore entrance. Ultrasonication also cuts the CNT to a length ranging from 200 nm to 1000 nm. The now-functionalized CNT is placed in another vessel containing pre-selected macrocyclic molecules and an anhydrous solvent. During a heating process, the CNT and macrocyclic molecule are bonded by a dehydration reaction. In the case of a purely hydrocarbon macrocycle, the bonding would be formed by an addition reaction of a hydroxyl group on the CNT with the double bond to form an ether linkage.

Further, a method of using the apertured CNT to separate and filter ions, particles, or other solutes in a mixture or solution from entering the pore entrance as a result of steric hindrance, is provided. The method generally includes embedding an array of apertured CNTs into an otherwise impermeable membrane such that the CNTs serve as conduits through the membrane. A solution or a similar particulate-containing fluid is then allowed to permeate through the membrane via the embedded array of CNTs. The resulting filtered discharge from membrane can then be collected for further use or processing.

An array of apertured CNTs embedded in an impermeable film and aligned perpendicular to the film surface can function as a high-flux RO membrane. Aligned CNT membranes have exhibited orders of magnitude increases of water flux rates over filters of similar pore size made from conventional materials.

DETAILED DESCRIPTION OF THE INVENTION

The present invention relates to compositions of and methods for preparing and using a macrocyclic pore-apertured carbon nanotube. Specifically, a CNT with an attached macrocyclic molecule is provided. The size of the aperture can be selected for specific uses. The apertured nanotubes may also be adapted for use within a filtration medium or system.

Figure 1:
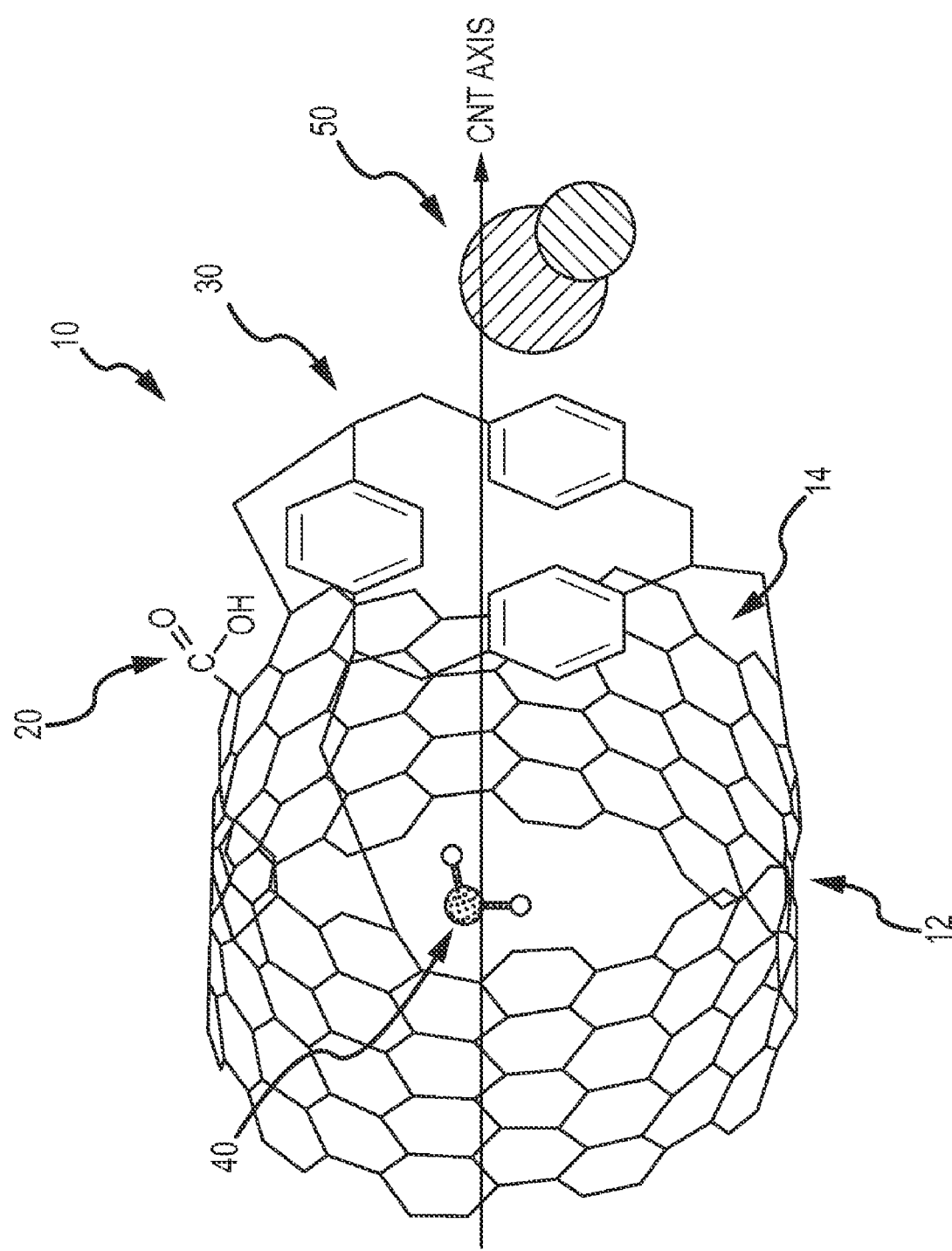
FIG. 1 is a perspective view of one embodiment of a macrocyclic pore-apertured carbon nanotube apparatus.
Figure 2:
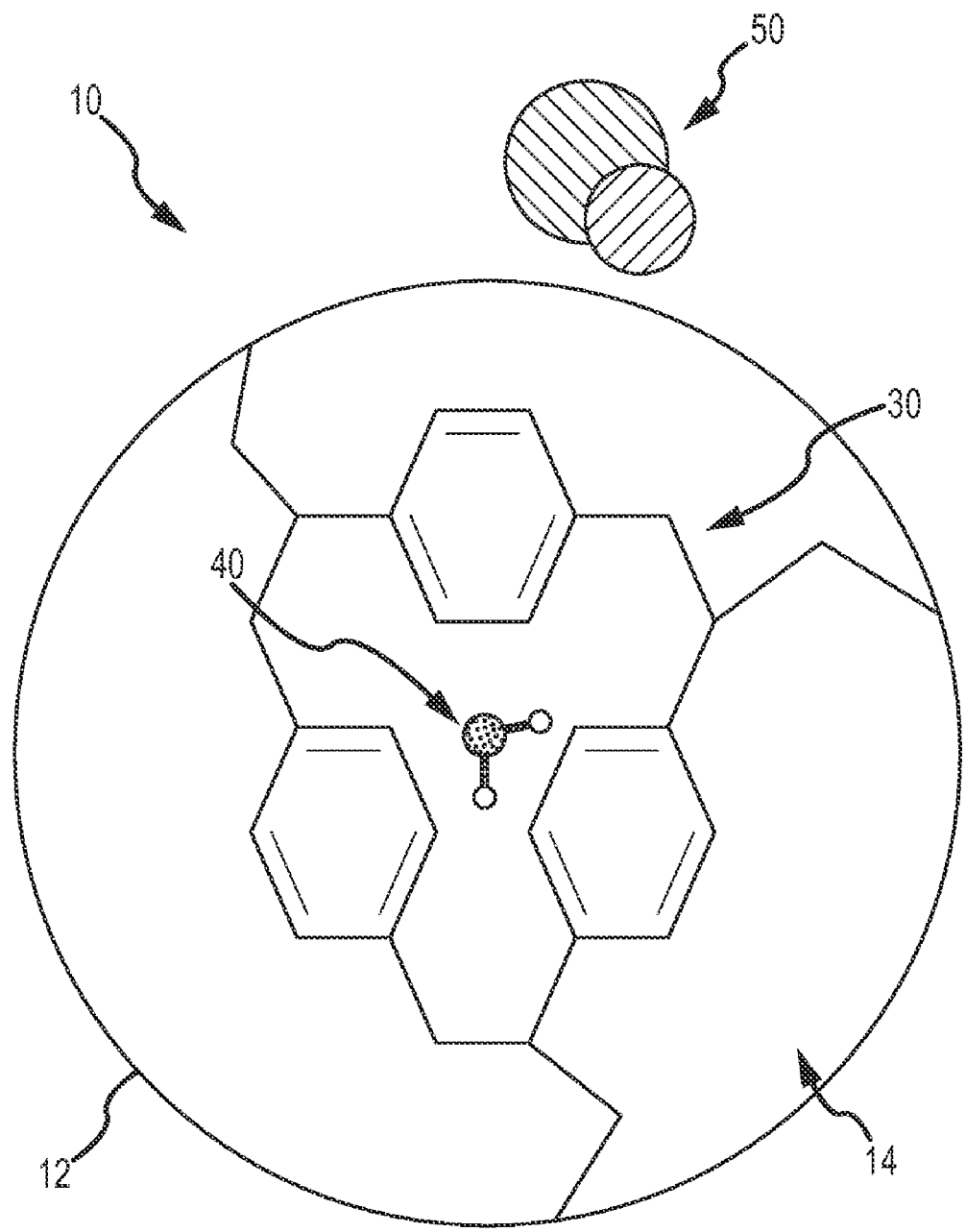
FIG. 2 is a bottom view along the center axis of the macrocyclic pore-apertured carbon nanotube apparatus of FIG. 1.

Referring now to the drawings, an exemplary embodiment of an apertured carbon nanotube apparatus is illustrated and generally indicated as 10 in FIGS. 1 and 2. The nanotube apparatus 10 includes a single-walled nanotube ("SWNT") 12 and a macrocyclic molecule 30. Composed of carbon allotropes from the fullerene structural family, typically graphene, the SWNT 12 has a generally cylindrical shape with at least one open pore entrance 14 at the ends of the nanotube. The pore entrance 14 is partially obstructed by a macrocyclic molecule 30, which functions as an aperture for the pore entrance 14. The SWNT 12 and macrocycle 30 apparatus combination is adapted to prevent hydrated ions 50 (e.g. $Na^+$ and $Cl^-$) that are larger than a water molecule 40 from entering the open pore entrance 14 of the SWNT 12. The hydrated ions 50 are prevented from entering the pore entrance by steric hindrance. As a result, these larger ions 50 are effectively separated from the solvent water molecules 40 that can traverse the pore entrance 14 of the SWNT 12. The SWNT 12 and macrocycle 30 combination 10 may be particularly well suited for desalination, as it can more efficiently remove many of the dissolved salts that make up 3.5% of saltwater.

The apertured nanotube apparatus 10 may include SWNTs 12 of various helicities. These SWNTs may be chiral, armchair, and/or zigzag nanotubes. A lattice vector (i.e. pair of indices [n,m]) describes the helicities of the SWNTs 12. The integers n and m denote a number of unit cells along two directions of the honeycomb crystal lattice of the rolled graphene sheet. The preferred chiral nanotubes have unit cell dimensions where both n and m range from 5 to 10. Therefore, the chiral nanotubes have lattice cell vectors that range from [5,5] to [10,10] (e.g. [5,5], [7,9], [8,5], [5,10], etc.) Armchair nanotubes have lattice vectors where n=m. The preferred armchair nanotube has a unit cell lattice vector that ranges from [5,5] to [10,10]. The apertured nanotube apparatus 10 may also include zigzag nanotubes that are defined by lattice vectors where m=0. The preferred helicities for zigzag nanotubes, are such that n ranges from 10-18, and therefore the preferred zigzag nanotubes have unit cell lattice vectors that range from [10,0] to [18,0]. Regardless of nanotube helicities, the preferred SWNTs 12 have finite lengths and diameters. Preferably, the SWNT 12 has an inner van der Waals diameter ranging from 0.4 nm to 1.1 nm, while the outer van der Waals diameter ranges from 1.0 nm to 1.7 nm. As contemplated in the present invention, the SWNT 12 has a length ranging from 200 nm to 1000 nm, thereby providing a length-to-diameter ratios of less than or equal to 1000:1.

The preferred SWNT 12 can be processed to bond to a macrocyclic molecule 30. Each pore entrance 14 of the SWNT 12 may contain one or more carboxyl functional groups (—COOH) 20 that are suitable to bond with the macrocyclic molecule 30. The carboxyl group 20 forms a covalent bond with an amine group (not shown) attached to the macrocyclic molecule 30. The covalent bond is a Carbon-Nitrogen bond formed by the covalent attachment of a functional group, comprising at least one nitrogen atom, to the carboxyl group 20. Carboxyl groups may occur naturally or they maybe added anywhere along the circumference of an open pore entrance 14. The macrocycle molecule 30 is linked to the SWNT 12 by at least two bonds, preferably three, to keep the macrocycle molecule 30 substantially over the pore entrance 14 and to keep it from twisting out of the way.

The macrocycle molecule 30 may be a ring-shaped alkene. As such, it may be a cycloalkene containing one or more carbon rings to which hydrogen atoms are attached, generally having the formula $C_nH_{2n-2}$, where n=18-24. The preferred cycloalkenes include aromatic hydrocarbons or arenes, having at least one aromatic ring. The molecule 30 therefore, serves as an aperture to a pore entrance 14 of the SWNT 12. The aperture molecule 30 may also include nitrogen, oxygen, and sulfur constituents which are externally bonded thereto. When externally bonded to the molecule 30, the nitrogen, oxygen, or sulfur components may form an amide, ester, and/or thioester bond with a carboxyl group 20 located around the open pore entrance 14. Hydrogen atoms and alkyl groups may also be bonded to any unbonded electrons within the macrocycle 30. The macrocycle 30 may also be selected from a group consisting of polyazacycloalkanes, polyoxacycloalkanes, polythiacycloalkanes, and combinations thereof.

The macrocyclic molecule 30 consists of a backbone chain that may include carbon, nitrogen, oxygen, or sulfur atoms. Preferably, the macrocyclic molecule 30 is composed of 18 to 24 atoms. The diameter of the molecule 30 dictates the aperture size of the SWNT 12, (e.g. a macrocyclic molecule 30 having a larger number of constituent molecules provides a larger aperture for the pore entrance 14 of the SWNT 12). It is further contemplated that the preferred macrocyclic molecule 30 has an inner diameter that may range from 0.3 nm to 0.6 nm.

Figure 3:
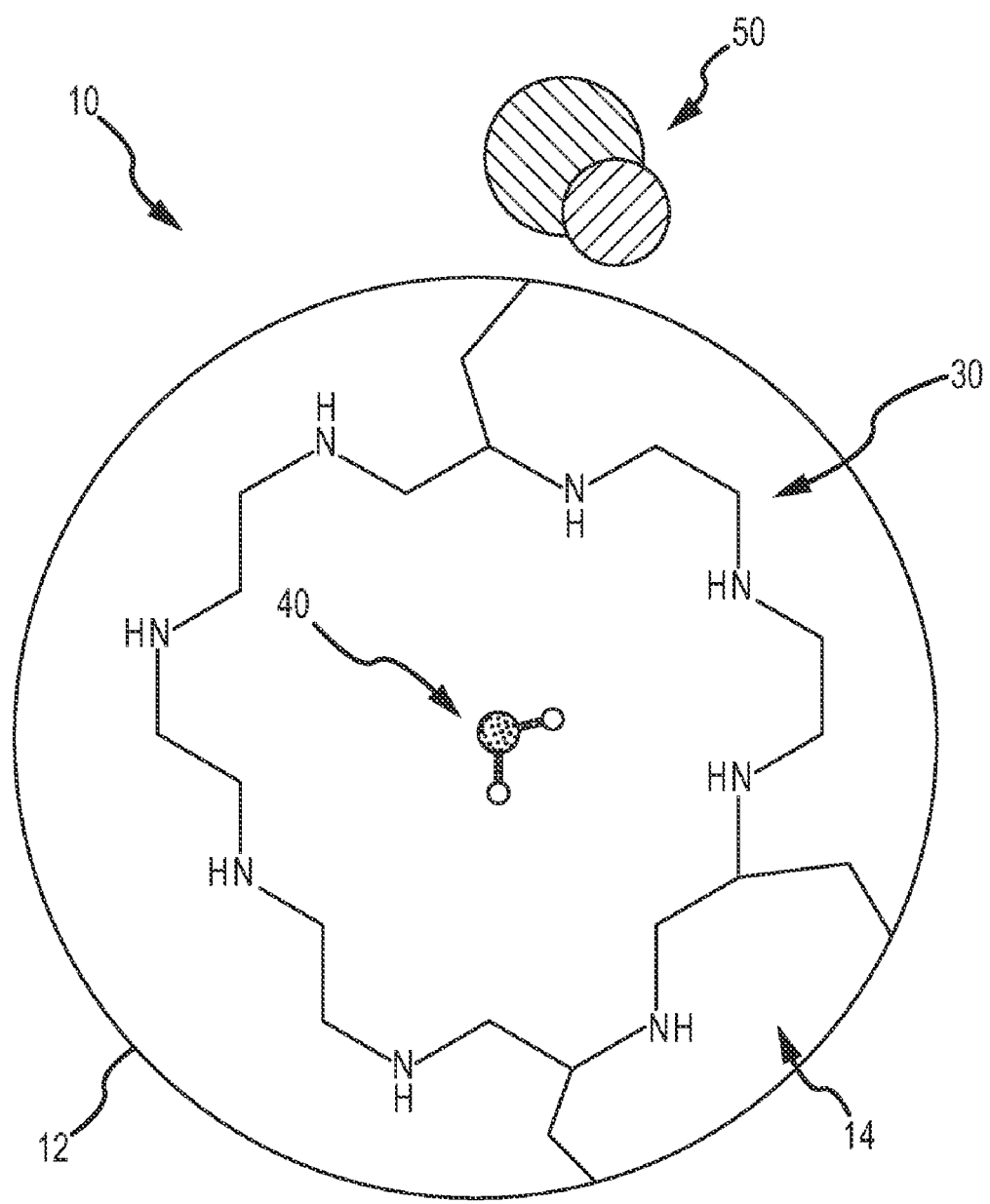
FIG. 3 is a bottom view along the center axis of a macrocyclic pore-apertured carbon nanotube apparatus according to another embodiment of the invention.

While the embodiment shown in FIGS. 1 and 2 show a macrocyclic molecule 30 with smaller rings, it should be understood that this is only one embodiment of the macrocyclic molecule 30. Referring to FIG. 3, an alternative embodiment of the apertured carbon nanotube apparatus is shown generally at 10. The apertured carbon nanotube apparatus 10 has a macrocyclic molecule 30 that does not include smaller rings and does not have a cyclic structure as part of its backbone. Thus, if cleaved, the macrocyclic molecule 30 of the embodiment in FIG. 3 is a linear molecule. Examples of the macrocyclic molecule 30, which do not include smaller rings, can be cycloalkanes with substituted nitrogen, sulfur or oxygen. In the embodiment of FIG. 3, macrocyclic molecule 30 has the structure of a 1, 4, 7, 10, 13, 16, 19, 22-Octaazacyclotetracosane. This represents a nitrogen-substituted aliphatic macrocycle having a useful pore diameter. It should be understood that this is but one example of a macrocyclic molecule 30 that does not include smaller rings. Cyclams and crown ethers are also examples of macrocyclic molecules 30 that do not include smaller rings. The macrocycle molecule 30 is linked to the SWNT 12 by at least two bonds, and preferably three, to keep the macrocycle molecule 30 substantially over the pore entrance 14.

The present invention also provides a method for making the apertured carbon nanotube apparatus 10. The SWNT 12 may be purified to remove any contaminants that formed during its manufacture using techniques known in the art. After purification, the SWNT 12 may be analyzed to determine if the pore entrance 14 contains any naturally occurring carboxyl groups 20. Any appropriate chemical or imaging means may be used for this analysis, including but not limited to resonance Raman spectroscopy.

Next, if it has been determined that the SWNT does not contain a carboxyl group 20 at the pore entrance 14, then carboxyl functional groups 20 may be formed by the process of ultrasonication. In a vessel (not shown), the SWNT 12 is subjected to ultrasonication in an acid solution (not shown) of $H_2SO_4$—$HNO_3$, having a concentration ratio of 3:1, respectively. The SWNT 12 and acid mixture is heated to a temperature of approximately 40° C. Ultrasonication further promotes an oxidation reaction between the pore entrance 14 of the SWNT 12 and the acid mixture. Oxidation of the SWNT 12 results in the formation of a carboxyl group 20 at the pore entrance 14. The ultrasonication process also cuts the SWNT 12 to a desired length ranging between 200 nm and 1000 nm.

Next, in another vessel (not shown) the functionalized SWNT 12 is bonded to the appropriately sized macrocyclic molecule 30, which may be synthesized through any appropriate method known in the art. The prepared molecule 30 along with the carboxylated SWNT 12 are placed in an anhydrous solvent to undergo an intermolecular reaction. The SWNT 12 and macrocyclic molecule 30 solution is heated in the closed vessel for several hours to drive a dehydration reaction. For example, a macrocyclic molecule 30 is bonded to the SWNT 12 via the carboxyl group 20 in the following reaction scheme, wherein X represents the macrocyclic molecule 30:

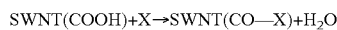

SWNT(COOH)+X→SWNT(CO—X)+$H_2O$

Figure 4:
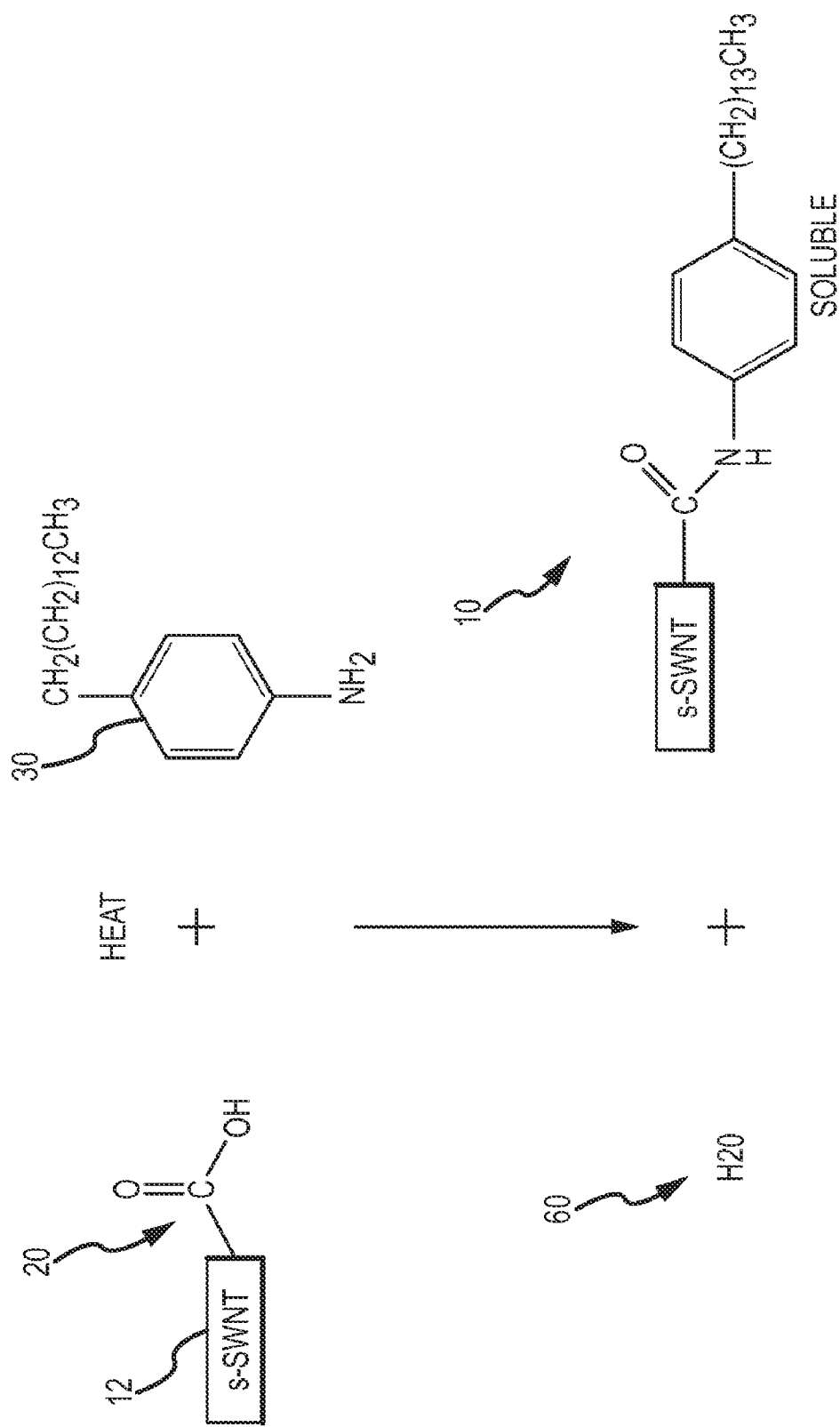
FIG. 4 is simplified depiction of a reaction to make the macrocyclic pore-apertured carbon nanotube apparatus.

FIG. 4 is a simplified depiction of an exemplary reaction whereby a SWNT 12, having a carboxyl group 20 at the open pore entrance 14, is allowed to react with a macrocyclic molecule 30. The SWNT 12 and macrocycle 30 are heated as previously described. During this heating, the carboxyl end 20 is processed in order to bond with the macrocycle 30. The reaction ultimately produces the apertured SWNT apparatus 10 and water 60 as a by-product.

The finished SWNT 12 with the bonded constituent macrocyclic molecule 30 can have a variety of uses. When used in a filtration system, the apertured nanotube apparatus 10 allows solvent molecules 40 (e.g. $H_2O$) to enter the pore entrance 14, while preventing the entrance of solute molecules 50 (e.g. hydrated $Na^+$ ions). The interior surface of the SWNT is smooth, straight, and hydrophobic which allows non-bonding molecules such as $H_2O$ to flow through at rates higher than Knudsen diffusion theory would predict. The nanotube apparatus 10 may also be used to filter out a variety of halogens and other molecules including $Na^+$, $K^+$, $Ca^+$, $Mg^+$, $Cl^-$, and $SO_4^{2-}$ by means of steric hindrance.

The present invention also provides an apparatus to use the apertured carbon nanotube. In an embodiment, an array of apertured nanotubes embedded in an impermeable film and aligned perpendicular to the film surface can function as a high-flux reverse osmosis membrane.

The compounds and molecules described herein may have asymmetric centers. Compounds of the present invention containing an asymmetrically substituted atom may be isolated in optically active or racemic form. All chiral, diastereomeric, racemic forms, and all geometric isomeric forms of a structure are intended, unless the specific stereochemistry or isomeric form is specifically indicated. All processes used to prepare compounds of the present invention and intermediates made therein are considered to be part of the present invention.

Definitions

Unless otherwise defined, all technical and scientific terms used herein have the same meaning as commonly understood by one of ordinary skill in the art to which this invention belongs. To facilitate understanding of the invention, several terms are defined below.

The term "acyl," as used herein alone or as part of another group, denotes the moiety formed by removal of the hydroxy group from the group COOH of an organic carboxylic acid, e.g., RC(O)—, wherein R is $R_1$, $R_1O$—, $R_1R_2N$—, or $R_1S$—, $R_1$ is hydrocarbyl, heterosubstituted hydrocarbyl, or heterocyclo, and $R_2$ is hydrogen, hydrocarbyl or substituted hydrocarbyl.

The term "acyloxy," as used herein alone or as part of another group, denotes an acyl group as described above bonded through an oxygen linkage (O), e.g., RC(O)O— wherein R is as defined in connection with the term "acyl."

The term "alkyl" as used herein describes groups which are preferably lower alkyl containing from one to eight carbon atoms in the principal chain and up to 20 carbon atoms. They may be straight or branched chain or cyclic and include methyl, ethyl, propyl, isopropyl, butyl, hexyl and the like.

The term "aromatic" as used herein alone or as part of another group denotes optionally substituted homo- or heterocyclic aromatic groups. These aromatic groups are preferably monocyclic, bicyclic, or tricyclic groups containing from 6 to 14 atoms in the ring portion. The term "aromatic" encompasses the "aryl" and "heteroaryl" groups defined below.

The term "aryl" or "Ar" as used herein alone or as part of another group denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

The term "colloid" or "colloidal" as used herein refers to a type of dispersion where one substance is dispersed evenly throughout another.

The terms "halogen" or "halo" as used herein alone or as part of another group refer to chlorine, bromine, fluorine, and iodine.

The term "heteroatom" shall mean atoms other than carbon and hydrogen.

The terms "heterocyclo" or "heterocyclic" as used herein alone or as part of another group denote optionally substituted, fully saturated or unsaturated, monocyclic or bicyclic, aromatic or non-aromatic groups having at least heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described below. Exemplary substituents include one or more of the following groups: hydrocarbyl, substituted hydrocarbyl, hydroxy, protected hydroxy, acyl, acyloxy, alkoxy, alkenoxy, alkynoxy, aryloxy, halogen, amido, amino, cyano, ketals, acetals, esters and ethers.

The term "heteroaryl" as used herein alone or as part of another group denote optionally substituted aromatic groups having at least one heteroatom in at least one ring, and preferably 5 or 6 atoms in each ring. The heteroaryl group preferably has 1 or 2 oxygen atoms and/or 1 to 4 nitrogen atoms in the ring, and is bonded to the remainder of the molecule through a carbon. Exemplary heteroaryls include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl and the like. Exemplary substituents include one or more of the following groups: hydrocarbyl, substituted hydrocarbyl, hydroxy, protected hydroxy, acyl, acyloxy, alkoxy, alkenoxy, alkynoxy, aryloxy, halogen, amido, amino, cyano, ketals, acetals, esters and ethers.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl, and alkynaryl. Unless otherwise indicated, these moieties preferably comprise 1 to 20 carbon atoms.

The "substituted hydrocarbyl" moieties described herein are hydrocarbyl moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, aryloxy, hydroxy, protected hydroxy, acyl, acyloxy, nitro, amino, amido, nitro, cyano, ketals, acetals, esters and ethers.

The term "macrocycle" as used herein refers to an organic molecule having a large ring structure that contains at least 8 carbons. By way of example, and not limitation, suitable macrocycles include porphyrins, porphyrazines, chlorins, phthalocyanines, texaphrins, cyclams, and crown ethers.

The term "solute" as used herein refers to a water soluble agent, including but not limited to inorganic salts and the corresponding ions thereof; organic polyols, including polypropylene glycol, glycerol and sugars such as, for example, glucose, mannose, fructose and mannitol; and metabolic products such as, for example, lactate or ammonia; which is effective in producing increased product expression. The term "solute" does not require that component to be present in less than 50% by volume or mass.

When introducing elements of the present invention or the preferred embodiments(s) thereof, the articles "a", "an", "the", and "said" are intended to mean that there are one or more of the elements. The terms "comprising", "including", and "having" are intended to be inclusive and mean that there may be additional elements other than the listed elements.

EXAMPLES

The following examples are intended to be illustrative of the present invention and to teach one of ordinary skill how to make and use the invention. These examples are not intended to limit the invention or its protection in any way.

Example 1

The present example describes a method used to prepare one or more SWNTs for bonding with a macrocycle. The continuous method was done as follows: In a first vessel, the SWNT was purified to remove any contaminants that formed during the manufacture of the nanotube. After purification, the SWNT was analyzed to determine if the pore entrance ends contained any naturally occurring carboxyl groups. Resonance Raman spectroscopy was used to examine the SWNT.

Next, once it was been determined that the SWNT did not contain a carboxyl group at the pore entrance, then the SWNT was prepared for the addition of a carboxyl functional group (s). In a second vessel, the SWNT was subjected to ultrasonication in a solution of sulfuric and nitric acid, having a respective concentration ratio of 3:1. A 25.4 mm ultrasonic horn was inserted into the vessel. The horn was driven by a 600 W 20 kHz ultrasonic processor in order to provide the horn tip with an amplitude of 33 μm and a dissipated power of approximately 12 W/cm$^2$. The SWNT and acid mixture was heated to a temperature of approximately 40° C. Ultrasonication was used to promote an oxidation reaction between the pore entrance of the SWNT and the acid mixture. Oxidation of the SWNT resulted in the formation of a carboxyl group at the pore entrance 14. The ultrasonication also cut the SWNT to a manageable length between 200 nm and 1000 nm.

Next, in a third vessel the functionalized SWNT was bonded to the desired appropriately sized macrocycle. The desired macrocycle was synthesized through a common method known in the art. The prepared molecule along with the carboxylated SWNT was placed in an anhydrous solvent to undergo an intermolecular reaction. The SWNT and macrocycle solution was heated in the closed vessel for several hours to drive a dehydration reaction. Finally, the SWNT and macrocycle aperture combination was collected from the vessel and cleansed.

Example 2

This example describes a method used to make a reverse osmosis membrane embedded with the SWNT and macrocyclic molecule combination suitable for desalination. The continuous method was done as follows: A plurality of the nanotube apparatuses were embedded in reverse osmosis membranes, such that they were aligned perpendicular to the surface of the membranes. The membrane was used to separate salt ions from brackish and saltwater. The Membranes embedded with aligned SWNTs exhibited orders of magnitude increases for water flux rates over filters of similar pore size made from conventional materials. When deployed as a means to desalinate water, the macrocyclic molecule was selected to prevent hydrated ions (i.e. $Na^+$ and $Cl^-$) that were larger than water molecules from entering the nanotube pore entrance. The hydrated ions were prevented from entering the pore entrance by steric hindrance. As a result, the larger ions were effectively separated from the solvent water molecules that entered the SWNT. The apparatus was particularly well suited for the desalination of seawater as it efficiently removed many of the dissolved salts that make up 3.5% of seawater.

All of the compositions and methods disclosed and claimed herein can be made and executed without undue experimentation in light of the present disclosure. While the compositions and methods of this invention have been described in terms of preferred embodiments, it will be apparent to those of ordinary skill in the art from this disclosure that variations may be applied to the compositions and methods and in the steps or in the sequence of steps of the method described herein without departing from the concept, spirit and scope of the invention. More specifically, it will be apparent from this disclosure that certain agents which are both chemically and physiologically related may be substituted for the agents described herein while the same or similar results would be achieved. All such similar substitutes and modifications apparent to those skilled in the art from this disclosure are deemed to be within the spirit, scope, and concept of the invention as defined by the claims.

What is claimed is:

1. A nanotube composition with at least one pore aperture adapted for filtering a solute in a solution, the nanotube composition comprising:

a single-walled carbon nanotube having a pore entrance at an end of the carbon nanotube and a carboxyl group on the pore entrance; and a macrocyclic molecule bonded to the carboxyl group on the carbon nanotube, the macrocyclic molecule forming a ring having an inner van der Waals diameter of between 0.4 nm and 1.1 nm which forms a molecular aperture that is an aperture for the pore entrance, the macrocyclic molecule being arranged and configured to prevent ions from traversing the pore entrance, and the molecular aperture being sized and configured to allow passage of water molecules therethrough.

2. The nanotube composition of claim 1, wherein the carbon nanotube is selected from the group consisting of chiral, armchair, and zigzag nanotubes.

3. The nanotube composition of claim 1, wherein the carbon nanotube has an outer van der Waals diameter from 1.0 nm to 1.7 nm.

4. The nanotube composition of claim 1 wherein the carbon nanotube has a length between 200 nm and 1000 nm 5. The nanotube composition of claim 1, wherein the macrocyclic molecule is a hydrocarbon-based ring.

6. The nanotube composition of claim 1, wherein the macrocyclic molecule is selected from the group consisting of polyazacycloalkanes, polyoxacycloalkanes, polythiacycloalkanes, and combinations thereof.

7. The nanotube composition of claim 1, wherein the macrocyclic molecule includes benzene rings.

8. The nanotube composition of claim 1, wherein the macrocyclic molecule does not include benzene rings.

9. The nanotube composition of claim 1, wherein the molecular aperture forms an inner diameter of the macrocyclic molecule ranging between 0.3 nm and 0.6 nm.

10. The nanotube composition of claim 1, wherein the aperture is structured and arranged to exclude the following ions: $Na^+$, $K^+$, $Ca^+$, $Mg^+$, $Cl^-$, $SO_4^{2-}$.

* * * * *